(12) United States Patent
Rebernik

(10) Patent No.: US 12,337,678 B2
(45) Date of Patent: Jun. 24, 2025

(54) MOUNTING SYSTEM FOR FASTENING A CRYOGENIC CONTAINER ONTO A VEHICLE FRAME

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: CRYOSHELTER LH2 GMBH, Dobl-Zwaring (AT); Cryoshelter BioLNG GmbH, Dobl-Zwaring (AT)

( * ) Notice: Subject to any disclaimer, the term of this patent is extended or adjusted under 35 U.S.C. 154(b) by 0 days.

(21) Appl. No.: 18/552,369

(22) PCT Filed: Mar. 30, 2022

(86) PCT No.: PCT/AT2022/060097
§ 371 (c)(1),
(2) Date: Sep. 25, 2023

(87) PCT Pub. No.: WO2022/204744
PCT Pub. Date: Oct. 6, 2022

(65) Prior Publication Data
US 2024/0051384 A1 Feb. 15, 2024

(30) Foreign Application Priority Data
Apr. 1, 2021 (AT) .............................. A 50062/2021

(51) Int. Cl.
*B28B 1/00* (2006.01)
*B28B 1/52* (2006.01)
(Continued)

(52) U.S. Cl.
CPC ............ *B60K 15/07* (2013.01); *F17C 13/084* (2013.01); *F17C 2201/035* (2013.01); *F17C 2223/0161* (2013.01)

(58) Field of Classification Search
CPC ....... B28B 1/52; B28B 19/0015; B33Y 40/20; B60K 15/07; B60P 7/0823; F17C 13/084;
(Continued)

(56) References Cited

U.S. PATENT DOCUMENTS

2015/0096977 A1  4/2015  Sirosh et al.
2019/0093827 A1* 3/2019  Yeggy .................. F17C 13/083

FOREIGN PATENT DOCUMENTS

DE   102017201967 A1 *  8/2018
EP      1380462 B1     11/2011
(Continued)

OTHER PUBLICATIONS

Description Translation for EP 3121051 from Espacenet (Year: 2018).*
(Continued)

*Primary Examiner* — Jason D Shanske
*Assistant Examiner* — Daniel M. Keck
(74) *Attorney, Agent, or Firm* — Workman Nydegger

(57) ABSTRACT

The invention relates to a system comprising a cryogenic container with a lateral surface and a first and a second end cap, at least two support brackets each with a mounting side for mounting on a vehicle frame, at least two tensioning straps for fastening the cryogenic container on the support brackets, wherein the cryogenic container rests with the lateral surface on the support brackets and is embraced by the tensioning straps over the lateral surface, wherein first and second operating components are located only on that side of an outermost tensioning strap, which faces the nearest end cap, wherein the first operating component is
(Continued)

arranged on a side of the cryogenic container facing the mounting side and the second operating component is arranged on a side of the cryogenic container facing away from the mounting side.

12 Claims, 6 Drawing Sheets

(51) Int. Cl.
    *B28B 19/00*     (2006.01)
    *B33Y 40/20*     (2020.01)
    *B60K 15/07*     (2006.01)
    *B60P 7/08*     (2006.01)
    *F17C 13/08*     (2006.01)

(58) Field of Classification Search
CPC ...... F17C 2201/0109; F17C 2201/0114; F17C 2201/035; F17C 2201/054; F17C 2201/056; F17C 2221/012; F17C 2221/033; F17C 2223/0161; F17C 2223/033; F17C 2270/0168
See application file for complete search history.

(56) References Cited

FOREIGN PATENT DOCUMENTS

| | | | |
|---|---|---|---|
| EP | 3093178 A1 * | 11/2016 | ....... B60K 15/03006 |
| EP | 3121051 B1 | 3/2018 | |
| EP | 3121505 B1 | 3/2018 | |
| EP | 3449174 A1 | 3/2019 | |
| WO | 2021042143 A1 | 3/2021 | |

OTHER PUBLICATIONS

International Search Report, mailed Jun. 23, 2022, from PCT/AT2022/060097, 6 pages.

* cited by examiner

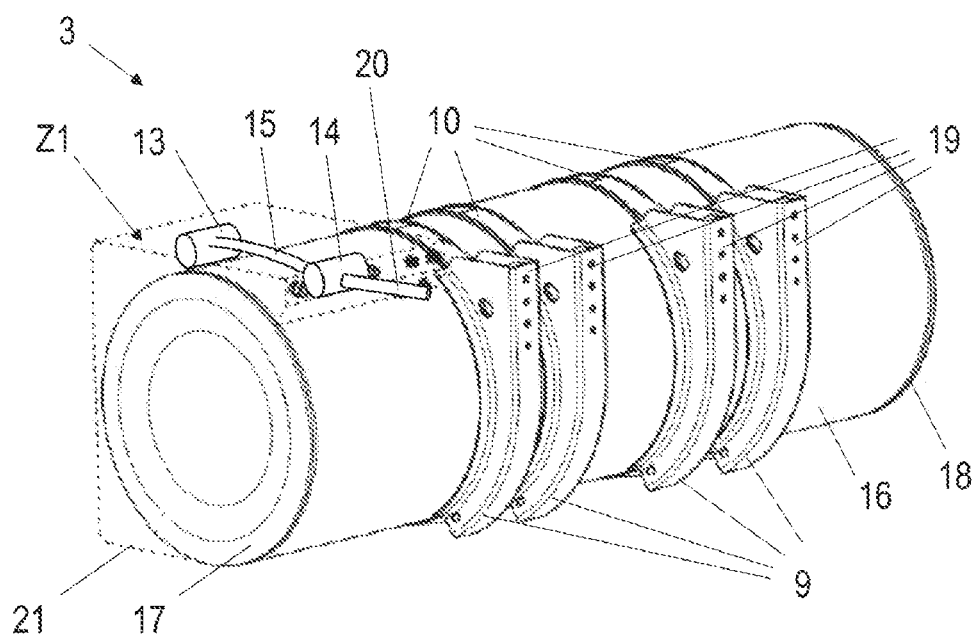
Fig. 7
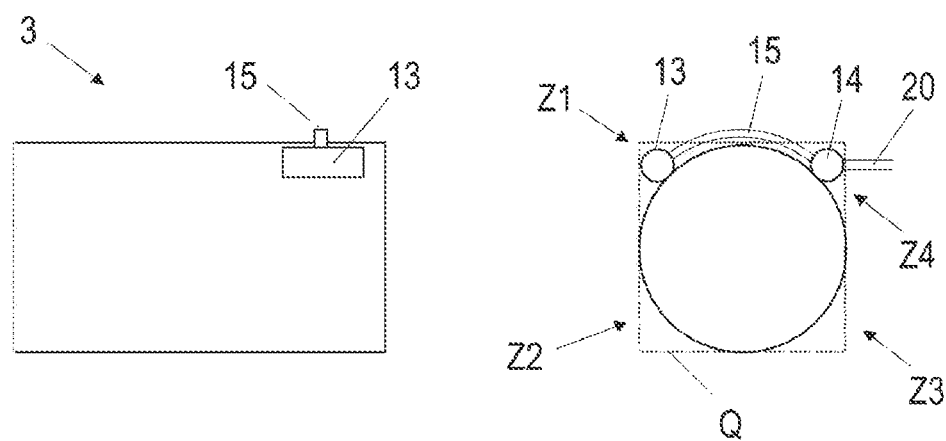
Fig. 8
Fig. 9

MOUNTING SYSTEM FOR FASTENING A CRYOGENIC CONTAINER ONTO A VEHICLE FRAME

The invention relates to a system comprising a cryogenic container having a lateral surface and a first and a second end cap, at least two support brackets each having a mounting side for mounting on a vehicle frame, at least two tensioning straps for fastening the cryogenic container to the support brackets, wherein the cryogenic container rests with the lateral surface on the support brackets and is embraced by the tensioning straps over the lateral surface, wherein the system further comprises at least a first and a second operating component of a withdrawal system, filling system, conditioning system and/or venting system of the cryogenic container.

From prior art it is known to mount cryogenic containers onto a motor vehicle, in which liquefied gas (e.g. LNG, "Liquid Natural Gas") is stored, which is used, for example, as fuel for the motor vehicle. A connection line is routed into each of the cryogenic containers, via which the cryogenic container may be filled.

In a certain type of vehicle, the cryogenic containers are mounted on the side of the vehicle between the front axle and the rear axle on support brackets and embraced by tensioning straps. For example, US 2015/0096977 A1 shows such a mounting system with support brackets and tensioning straps.

In combination with cryogenic containers mounted in this way, operating components such as a heat exchanger may in addition be used, which expands the cold cryogenic fluid taken from the cryogenic container in the liquid state and thus brings it to a temperature such that the cryogenic fluid is suitable as fuel for the vehicle's engine. In classic embodiments, the operating components are arranged behind the end caps of the cryogenic container, which, however, results in the cryogenic container having to be made shorter and therefore less fuel may be carried.

In order to make better use of the available installation space, the heat exchanger may be configured to be rod-shaped and arranged in parallel to the cryogenic container on its lateral surface. Such an arrangement is known, for example, from the "Iveco LNG Stralis" system, in which the heat exchanger is arranged on the upper side of the cryogenic container and faces the vehicle frame. Of course, the heat exchanger may also be arranged on the side facing away from the vehicle frame, as shown, for example, in EP 3 121 505 B1.

However, problems arise when the mounting variant of the support brackets with tensioning straps is combined with a heat exchanger located on the lateral surface of the cryogenic container or operating components located on the lateral surface of the cryogenic container, respectively. Since the tensioning straps will limit the space provided on the lateral surface, in some promising further developments it has been envisaged to provide a cover, under which the heat exchanger and the operating components are arranged and over which the tensioning straps are routed, see, for example, EP 3 121 505 B1. If the cover has a corresponding rounding, the forces of the tensioning straps may be transferred well to the cryogenic container without the heat exchanger or the operating components having to interact with the tensioning straps. However, this embodiment has the disadvantage that the tensioning straps must first be released before the heat exchanger or the operating components may be accessed, for example, for maintenance work. An obvious option would be to route the tensioning straps around the cryogenic container and route the heat exchanger and the operating components above the tightening straps, but this would again result in the tensioning straps not being releasable without removing the heat exchanger or the operating components.

It is therefore the task of the invention to create a system for mounting a cryogenic container onto a vehicle frame, in which, on the one hand, the available installation space is utilised as well as possible and, on the other hand, rapid and simple mounting of the cryogenic container onto the vehicle frame or simple maintenance of the operating components is being ensured.

This task is solved by a system comprising a cryogenic container with a lateral surface and a first and a second end cap, at least two support brackets each with a mounting side for mounting onto a vehicle frame, at least two tensioning straps for fastening the cryogenic container on the support brackets, wherein the cryogenic container rests with the circumferential surface on the support brackets and is embraced by the tensioning straps over the lateral surface, wherein the system further comprises at least a first and a second operating component of a withdrawal system, filling system, conditioning system and/or venting system of the cryogenic container, wherein the first and the second operating component are located only on that side of an outermost tensioning strap, which faces the nearest end cap, wherein the first operating component and the second operating component are at least in part, preferably completely, mounted at different ones of the following positions: on the lateral surface on an upper side of the cryogenic container facing away from the mounting side in the operating position, on the lateral surface on an upper side of the cryogenic container facing the mounting side in the operating position, on the lateral surface on a lower side of the cryogenic container facing away from the mounting side in the operating position, on the lateral surface on a lower side of the cryogenic container facing the mounting side in the operating position and, if the respective nearest end cap has a convex curvature, in a cap spandrel, which is enclosed between the end cap and a smallest possible imaginary cylinder above this end cap.

The system according to the invention has the advantage that as many operating components as possible may be arranged close to the cryogenic container, but do not have to cross over or under the tensioning straps. This advantage is only achieved by combining two measures. The first measure is that the operating components of the cryogenic container are only arranged at the end, i.e. on that side of an outermost tensioning strap, which faces the nearest end cap, whereby the operating components do not cross the tensioning straps.

As a second measure, the operating components are arranged in a distributed manner, since in a purely end-side arrangement of operating components there will be available only extremely little space for the arrangement of the operating components. In order to arrange the operating components in a distributed manner, one of the operating components may be arranged at least in part on the lateral surface of the cryogenic container and another one either in a cap spandrel, if the end cap is convexly curved, or at least in part on the lateral surface on a correspondingly different side of the cryogenic container. Compared to the linear arrangement of the operating components along the lateral surface known from prior art, the solution according to the invention has the advantage that the space required in the longitudinal direction of the cryogenic container is extremely small, which, in combination with the first measure explained above, brings with it the advantage according to the invention of easy dismantling of the cryogenic container.

In particular, the cryogenic container with the operating components mounted thereon may now be used as a compact unit, which may be placed on the support brackets as a whole. On the one hand, the operating components need not be removed in order to secure the cryogenic container to or detach it from the vehicle. On the other hand, the tensioning straps also need not be removed in order to maintain or replace one of the operating components, as would be necessary if the tensioning straps were routed over the operating components.

By "at least in part at the positions mentioned" it is understood that an operating component, for example on the side facing away from the nearest tensioning strap, could also protrude beyond the later surface and, for example, protrude beyond one of the end caps or protrude even further.

Preferably, the first and/or the second operating component are at least in part, preferably completely, located in spandrels, which are enclosed between the lateral surface and a smallest possible imaginary cuboid circumscribing the lateral surface, the side surfaces of which are arranged horizontally or vertically, respectively, in the operating position. This solution further defines the proximity of the operating components to the cryogenic container and, in particular, ensures that not only the cryogenic container but rather also its operating components are located in an installation space available next to the vehicle frame.

Furthermore, the first and second operating components may be connected by means of a connection line preferably routed in the circumferential direction of the lateral surface and, particularly preferably, be in fluid connection. In this way, it may be provided that the operating components are connected, even though they are not arranged directly next to one other. In particular, several operating components of the withdrawal system may be distributed over the circumference of the lateral surface by means of the connection line, which is particularly preferred since these operating components in general will require a large amount of space.

Furthermore, it is advantageous that the first and second operating components are enclosed by a common cover. In this way, there need not be provided two separate covers and the operating components may be made accessible at the same time if only one cover is removed.

Further preferably at least one of the operating components is arranged on the side of the cryogenic container facing away from the mounting side and the system further comprises a connection line, which is connected to this operating component and is preferably routed in the circumferential direction of the lateral surface above or below the cryogenic container to the vehicle frame or is routed behind or in front, respectively, of the end cap to the vehicle frame. In this way, there may be provided a suitable line routing for the connecting line without crossing the tensioning straps.

In the embodiment mentioned above, it is particularly preferred if the respective nearest end cap has a convex curvature and the connection line is routed through a spandrel enclosed between the end cap and a smallest possible imaginary cuboid above this end cap. In this way, the available installation space may be utilised particularly effectively.

Particularly preferably, the first and the second operating components are selected from the following list: heat exchanger, economizer, pressure relief valve, check valve, manual valve, electromechanical valve, electrical switch for this purpose, in particular emergency stop switch, valve module comprising at least two valves, filling fitting, venting connection, draining connection, pump, pressure build-up device, pressure gauge and control unit for at least one of the aforementioned operating components. The heat exchanger is generally required to vaporise withdrawn cryogenic fluid and thereby raise its temperature, which is generally necessary as the engine requires a certain minimum temperature of the cryogenic fluid. An economizer is understood to be a device that controls whether cryogenic fluid in gaseous phase or liquid phase is withdrawn from the cryogenic container in order to regulate the pressure within the cryogenic container. There may be provided at least one pressure relief valve, typically two pressure relief valves, to ensure that the cryogenic fluid can escape from the cryogenic container if the pressure in the cryogenic container exceeds a threshold. Check valves are provided, for example, to prevent cryogenic fluid that has already been withdrawn from returning into the cryogenic container. Manual valves may be provided, for example, to manually stop a further withdrawal of cryogenic fluid. Cryogenic fluid is introduced into the cryogenic container via the filling coupling. Cryogenic fluid in gaseous phase may be withdrawn from the cryogenic container via the venting connection in order to manually lower the pressure in the cryogenic container and to selectively remove the gaseous phase. The pump and/or pressure build-up device are typically used as part of a conditioning system to control the condition (pressure, temperature, etc.) of the cryogenic fluid in the cryogenic container. The control device may be provided to control operating components, in particular valves, of the withdrawal system, filling system, conditioning system and/or venting system. Particularly preferably, the first operating component is a heat exchanger and the second operating component is a filling fitting (filling coupling), each of which is preferably located at least in part above the lateral surface of the cryogenic container and is distributed over the circumference of the lateral surface.

Particularly preferably, the first operating component is a heat exchanger, which is at least in part arranged on the lateral surface, and the second operating component is a filling fitting, which is preferably at least in part arranged on the lateral surface. It is appreciated that further operating components may be present at other locations of the cryogenic container or adjacent to the heat exchanger or the filling fitting, respectively.

The invention may thus provide a vehicle with a vehicle frame and a system of the embodiments mentioned above, wherein the support brackets are mounted on the vehicle frame and the cryogenic container is fastened to the support brackets by means of the tensioning straps.

Advantageous and non-limiting embodiments of the invention are explained in greater detail in the following with reference to the drawings.

FIG. 7 shows a second embodiment according to the invention in a perspective view.

FIG. 8 shows the arrangement of FIG. 7 in a side view.

FIG. 9 shows the arrangement of FIG. 7 in a rear view.

Figure 1:
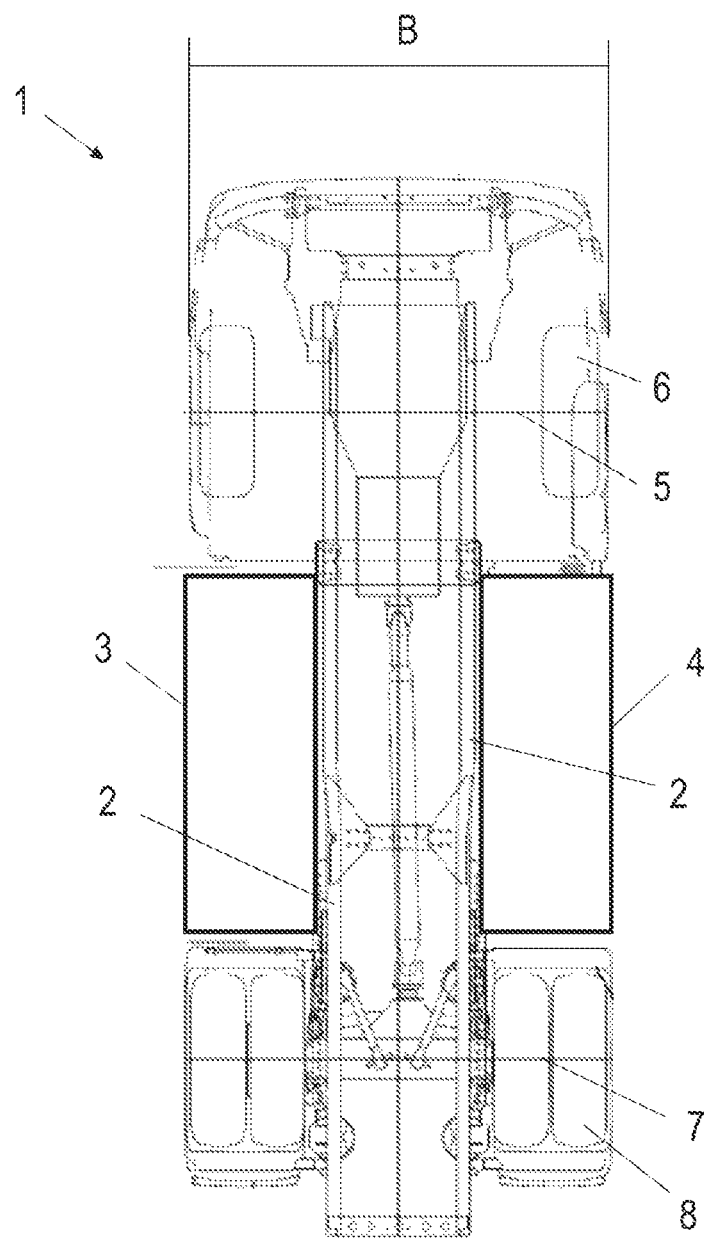
FIG. 1 shows a top view of a vehicle with cryogenic containers mounted thereon.

FIG. 1 shows a vehicle 1 with a vehicle frame 2, on which two cryogenic containers 3, 4 are mounted. In general, however, only one cryogenic container 3 may be mounted on one side of the vehicle frame 2. The cryogenic containers 3, 4 store cryogenic fluid used as fuel for an engine of the vehicle 1, such that the cryogenic containers 3, 4 are also referred to as fuel tanks.

The cryogenic fluid stored in the two cryogenic containers 3, 4 may be hydrogen, for example, such that the respective cryogenic container 3, 4 is a hydrogen container, or the cryogenic fluid may be LNG (Liquefied Natural Gas), such that the cryogenic container 3, 4 is an LNG container. Depending on the cryogenic fluid, the cryogenic container 3, 4 is thus adapted to store cryogenic fluid at temperatures of, for example, below 150 Kelvin, or in the case of hydrogen, even below 50 Kelvin or below 30 Kelvin or substantially 20 Kelvin. Depending on the application, the cryogenic container 3, 4 could, for example, be configured for storing sLH2 (subcooled liquid hydrogen) or CcH2 (cryo-compressed hydrogen) and thus also be adapted for corresponding high pressures, e.g. for maximum pressures between 5 bar and 350 bar.

The cryogenic containers 3, 4 are arranged on the vehicle 1 in an installation space, which is located laterally on the vehicle frame 2 between front wheels 6 mounted on a front axle 5 and rear wheels 8 mounted on a rear axle 7. Laterally, the installation space is limited by the vehicle frame 2 or the width B of the vehicle 1, respectively, e.g. the width of the driver's cab of the vehicle 1. At the bottom, the available installation space is also limited by a minimum ground clearance height and at the top by an upper frame edge of the vehicle frame 2, since the cryogenic container 3, 4 should not protrude beyond the vehicle frame 2, for example, to prevent collisions with a semi-trailer not further depicted.

Figure 2:
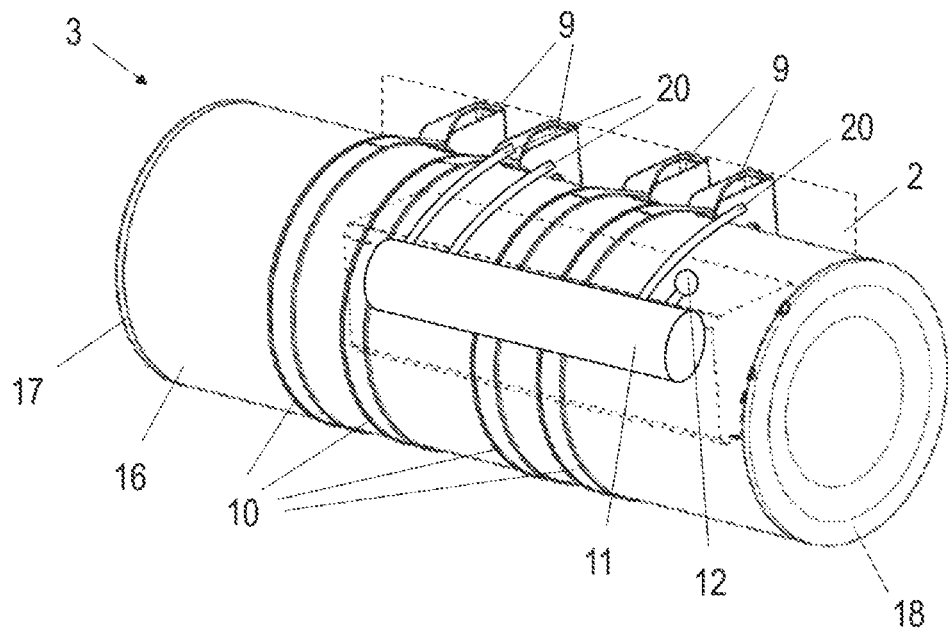
FIG. 2 shows the mounting of cryogenic containers on vehicles according to the state of the art in a perspective view.
Figure 3:
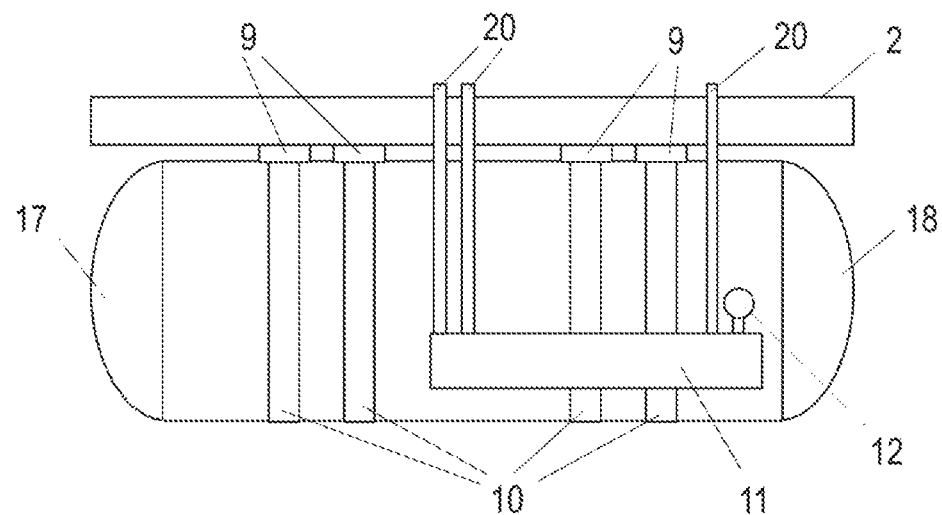
FIG. 3 shows the mounting of cryogenic containers on vehicles according to the prior art in a top view.

From the prior art summarized in FIGS. 2 and 3, it is known that the cryogenic containers 2 are to be mounted on the vehicle frame 2 within the aforementioned installation space by supporting the cryogenic containers 3, 4 on support brackets 9 and tensioning these on the support brackets 9 by means of tensioning straps 10. The cryogenic containers 3, 4 comprise a substantially cylindrical lateral surface 16 and have convex end caps 17, 18 (shown in FIG. 2 with flat end caps only for ease of reference, which was previously unknown in this form).

It may be further seen in the FIGS. 2 and 3 that not only the cryogenic container 3, 4, but rather also other operating components 11, 12 may be stored within said installation space. As depicted, for example, a heat exchanger 11 and a pressure indicator 12 of the withdrawal system of the cryogenic container 3, 4 are also stored on the cryogenic container 3, 4 within said installation space. If necessary, however, connection lines 20 may be routed from the operating components 11, 12 via the cryogenic container 3, 4 to the vehicle frame 2, for example to supply cryogenic fluid to the engine of the vehicle 1 or to provide and discharge heat exchange medium for the heat exchanger 11. It is known from prior art to arrange all these operating components next to each other for easy mounting such that at least the heat exchanger 11 is arranged above the tensioning straps 10. However, this does not allow the cryogenic container 3, 4 to be easily removed from the vehicle frame 2.

In general—and also in the invention—the operating components to be arranged in said installation space may be parts of a withdrawal system, filling system, conditioning system and/or venting system of the cryogenic container 3, 4 such as, for example a heat exchanger, economizer, pressure relief valve, check valve, manual valve, electromechanical valve, electrical switch for this purpose, in particular emergency stop switch, valve module comprising at least two valves, filling connection, venting connection, draining connection, pump, pressure build-up device, pressure gauge and control unit for at least one of the operating components mentioned above. It can be seen that the multitude of operating components take up a lot of space on or possibly also next to the cryogenic container 3, 4.

According to the invention, there is therefore provided according to the FIGS. 4 to 9 that at least a first and a second operating component 13, 14 are arranged at different locations of the circumference of the cryogenic container 3, 4, which may optionally be connected by means of a connection line 15. According to the FIGS. 10 and 11, one of the operating components 13, 14 may also be located adjacent to one of the end caps 17, 18.

For the purposes of the present invention, the cryogenic container 3, 4 has a lateral surface 16 and two end caps 17, 18, which may be flat or curved as shown. In the embodiments depicted, there are used four support brackets 9, even though in general there are used at least two support brackets 9. Regardless of the number of support brackets 9, one tensioning strap 10 is generally used per support bracket 9. As shown, the tensioning straps 10 are routed in the circumferential direction around the lateral surface 16 such that the cryogenic container 3, 4 may be mounted on the vehicle frame 2 by means of the support brackets 9.

The support brackets 9 each have a mounting side 19 for mounting on the vehicle frame 2, which is opposite to the side of the support brackets 9, on which the cryogenic container 3, 4 is to rest. The vehicle frame 2 has a surface complementary to the support brackets 9, such that the support brackets 9 may be mounted thereon by means of the mounting sides 19. The mounting sides 19 are usually vertical, but could also be inclined if the vehicle frame 2 is configured accordingly.

As depicted, the support brackets 9 each have a rounded section. which in some sections surrounds the cryogenic container 3, 4. In this way, the support bracket 36 may absorb part of the weight of the cryogenic container 3, 4 even without the tensioning straps 10, wherein the tensioning straps 10 are of course still required to tension the cryogenic container 3, 4 against the support brackets 9. However, the rounding of the support brackets 9 should preferably be dimensioned in such a way that the support brackets 9 themselves do not protrude below the minimum ground clearance level. The support brackets 9 could also have a different shape than depicted and could also be straight, for example, wherein the support brackets 9 already define an operating position of the cryogenic container 3, 4 on the vehicle frame 2 due to their design and the mounting side 19.

Figure 4:
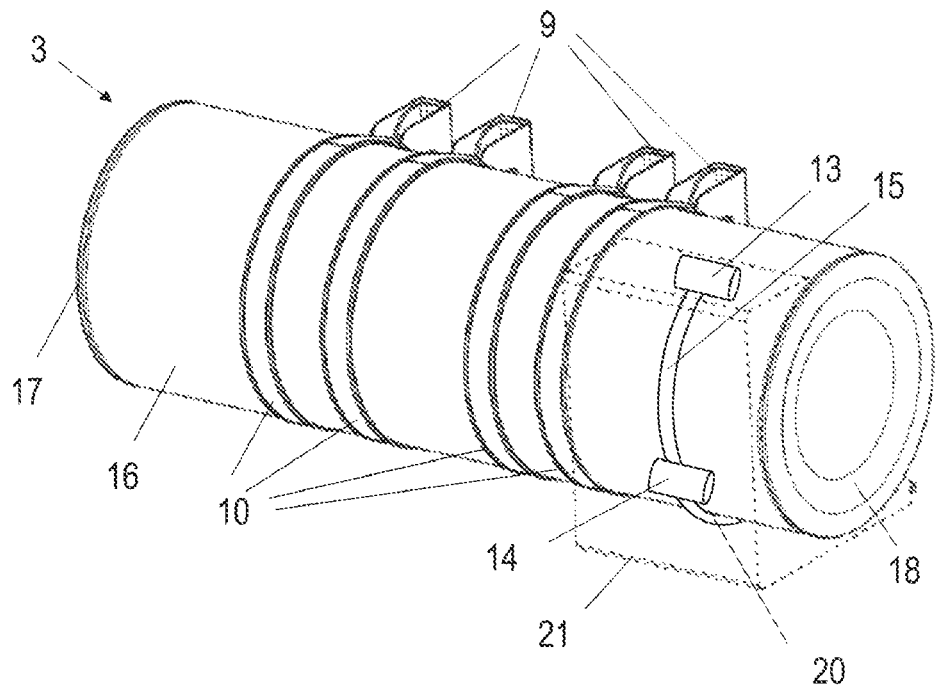
FIG. 4 shows a first embodiment according to the invention in a perspective view.

According to the invention, all operating components 13, 14 are arranged only on that side of an outermost tensioning strap 10, which faces the nearest end cap 17, 18. FIG. 4 shows that the outer right and outer left tensioning straps 10 form the two outermost tensioning straps 10. Regardless of whether the cryogenic container 3, 4 is mounted on the vehicle frame 2 by means of two, four, six or any other number of tensioning straps 10, only two of the tensioning straps 10 will form the outermost tensioning straps 10.

Each of the outermost tensioning straps 10 now defines two sides, one facing the nearest end cap 17, 18 and one facing away from the nearest end cap 17, 18. If all operating components 13, 14 are now arranged only on that side of an outermost tensioning strap 10, which faces the nearest end cap 17, 18, it may be ensured that none of the operating components 13, 14 and also no connection line 20 of the operating components 13, 14 need to cross one of the tensioning straps 10. Although the figures only show that the operating components 13, 14 are located at the right outer edge of the cryogenic container 3, 4, operating components 13, 14 could alternatively or additionally also be located at the left outer edge of the cryogenic container 3, 4, i.e. on the left side of the left outer tensioning strap 10.

However, due to the multiplicity or size of the operating components 13, 14, it does not seem possible to arrange all operating components 13, 14 in a linear manner on only one side of the outermost tensioning strap 10. As a further measure, the invention therefore provides for arranging the operating components 13, 14 along the circumference of the cryogenic container 3, 4, i.e. the circumference of the lateral surface 16, in order to make better use of the installation space available.

In the embodiment of FIG. 4, for example, it is shown that a first operating component 13 is arranged on an upper side of the cryogenic container 3, 4 in the operating position and a second operating component 14 is arranged on a lower side in the operating position. The operating position is already well-defined as soon as the cryogenic container 3, 4 rests on the support brackets 9, since these define the position in relation to the vehicle 1 by means of the mounting sides 19 and the shape, e.g. curvature. Both operating components 13, 14 are each located on the side of the cryogenic container 3, 4 facing away from the mounting side 19, but could also be located on the side of the cryogenic container 3, 4 facing the mounting side 19. The term "facing the assembly side 19" is understood herein as synonymous with "facing the vehicle frame 2". In particular, the terms "the upper or lower side of the cryogenic container 3, 4 in an operating position" are preferably understood with reference to a horizontal plane, which divides the cryogenic container 3, 4 substantially symmetrically into an upper and lower side. The terms "facing or facing away from, respectively, the mounting side 19 in an operating position" are preferably understood with reference to a vertical plane, which divides the cryogenic container 3, 4 substantially symmetrically into a side facing or facing away from the mounting side 19.

Figure 12:
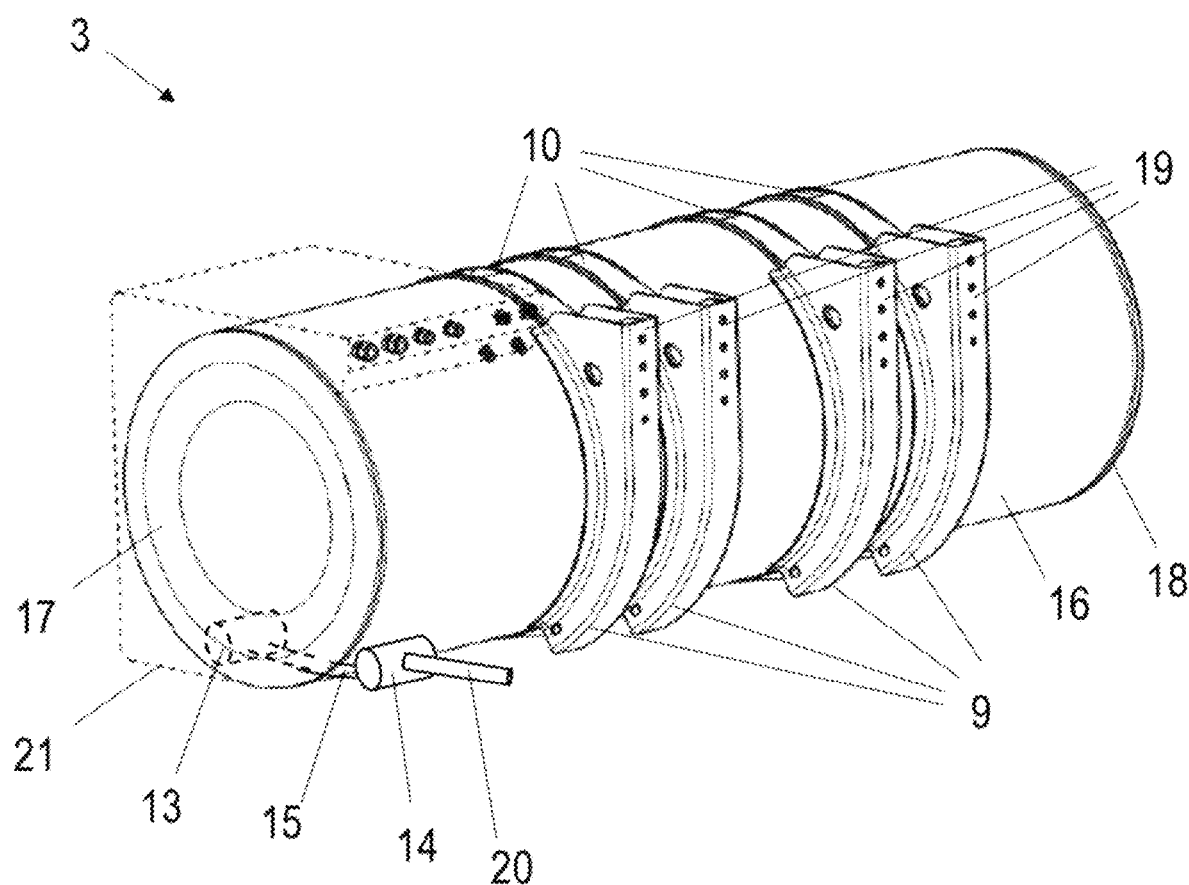

Alternatively or additionally, as shown in FIG. 7, there may be provided that the first operating component 13 is arranged on a side of the cryogenic container 3, 4 facing away from the mounting side 19 and the second operating component 14 on a side of the cryogenic container 3, 4 facing the mounting side 19. Both operating components 13, 14 are arranged on the upper side in the operating position, but could also be located on the lower side located in the operating position as illustrated in FIG. 12.

In both embodiments of the FIGS. 4 and 7, the operating components 13, 14 are therefore distributed around the circumference of the lateral surface 16, resulting in improved utilisation of the installation space available. It is understood that there may also be arranged more than two operating components 13, 14 around the circumference of the lateral surface 16. For example, two, three or four of the following operating components 13, 14 may be arranged on the lateral surface 16: a first operating component 13 at the top and facing away from the mounting face 19, a second operating component 14 at the bottom and facing away from the mounting face 19, a third operating component at the top and facing the mounting face 19; and a fourth operating component at the bottom and facing the mounting face 19. "Arranged on the lateral surface" herein means that the operating components 13, may be arranged either in direct contact or at a predetermined maximum distance, e.g. a maximum of 1 cm, 5 cm or 10 cm, from the lateral surface 16. Furthermore, "arranged on the lateral surface" is understood to mean that the respective operating component 13, 14 is at least in part arranged on the lateral surface and may also project beyond the lateral surface, e.g. in the longitudinal direction. Alternatively, the respective operating component 13, 14 could also be arranged completely on the lateral surface 16 and not project beyond the lateral surface 16 in the longitudinal direction.

Figures 5, 6:
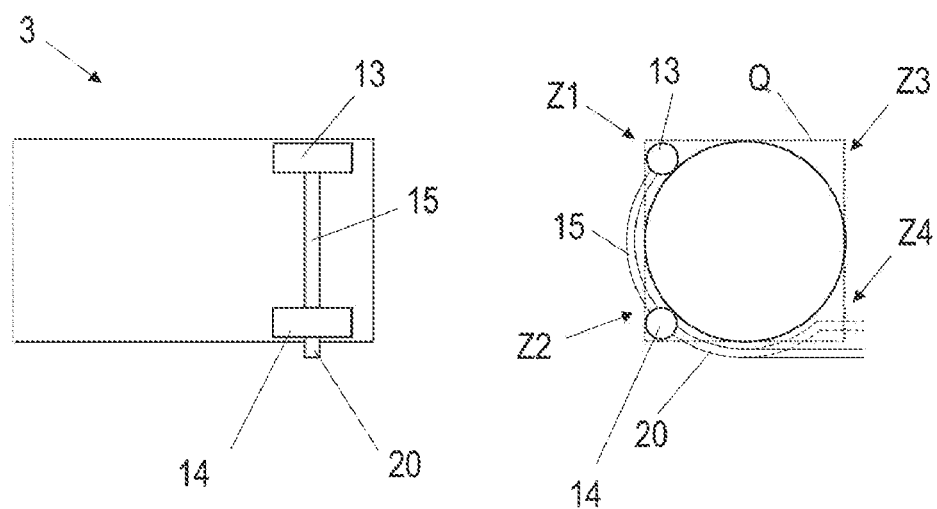
FIG. 5 shows the arrangement of FIG. 4 in a side view.
FIG. 6 shows the arrangement of FIG. 4 in a rear view.

In the FIGS. 6 and 9 there is further also shown a cuboid Q circumscribing the lateral surface 16. The cuboid Q is the smallest possible imaginary cuboid Q circumscribing the cryogenic container 3, 4 or the lateral surface 16, and optionally also the tensioning straps. The tensioning straps 10 are also in general to be arranged within the installation space available. The cuboid Q is adapted in such a way that all its side surfaces are arranged horizontally or vertically in the operating position of the cryogenic container 3, 4. Furthermore, it can be seen from the above-mentioned figures that there are formed four spandrels Z1-Z4 between the cuboid Q and the lateral surface 16. According to the invention, the first operating component 13 is arranged in one of the spandrels and the second operating component 14 is arranged in another one of the spandrels in order to achieve the distribution of the operating components 13, 14 around the circumference of the lateral surface 16. The operating components 13, 14 are arranged at least in part, preferably completely, in the respective spandrels Z1-Z4. By "at least in part" it may preferably be understood that the operating components 13, 14, while being located within the cuboid Q in a cross-section along the longitudinal axis of the cryogenic containers 3, 4, see FIGS. 8 and 9, may also project beyond one of the end caps 17, 18. Alternatively, "at least in part" can also be understood to mean that the operating components 13, 14 also protrude beyond the cuboid Q in a cross-section along the longitudinal axis of the cryogenic containers.

As shown in the FIGS. 4 to 9, the two operating components 13, 14 are connected by means of a connection line 15. If the first operating component 13 is, for example, a connection fitting or an economizer, via which cryogenic fluid may be withdrawn from the cryogenic container 3, 4, the cryogenic fluid withdrawn can be routed via the connection line 15 to the second operating component 14, which is, for example, a heat exchanger, i.e. evaporator. Via the connection line 20 depicted, the cryogenic fluid may be routed from the second operating component 14 to the vehicle 1, e.g. to an engine of the vehicle 1. The connection line 15 therefore provides a fluid connection between the two operating components 13, 14.

In other cases, the first operating component 13 may also be a control device and the second operating component 14, for example, an electric economizer, a valve or the like. In this case, the connection line 15 is an electrical connection for transmitting signals and does not enable fluid connection. However, the control line may also be provided in addition to a fluid connection.

In order to transfer cryogenic fluid to the vehicle 1 or its engine, respectively, there may be provided the connection line 20 already mentioned. This may, for example, be routed to the vehicle frame 2 in the installation space available, for example through a spandrel enclosed between the smallest possible imaginary cuboid or cylinder and the cryogenic container 3, 4 next to convex end caps, as is known from EP 3 121 505 B1. Alternatively, the connection line 20 could also be routed under the cryogenic container 3, 4 (FIG. 4) or above the cryogenic container 3, 4 (FIG. 7) to the vehicle frame 2, from where the connection line 20 may be routed to the engine. In this case, the connection line 20 could be routed either within the installation space available, if the cryogenic container 3, 4 has a correspondingly smaller diameter or a shorter length, or outside of the installation space available, for example below or above the cryogenic container 3, 4. Another possibility would be to route the connection line 20 in front of or behind the installation space available through space not utilized that results from the rounding of the front wheel 6 or rear wheel 8, i.e. the connection line 20 is routed to the vehicle frame 2 behind or in front of the end cap 17, 18.

If the connection line 20 is routed from a side of the cryogenic container 3, 4 facing away from the mounting side 19 above or below the cryogenic container 3, 4 to the vehicle frame 2, the connection line 20 may be routed horizontally from the highest or lowest point to the vehicle frame 2, see the solid lines in FIG. 6, or be adapted to the curvature of the cryogenic container 3, 4 and enter a spandrel located on a side of the cryogenic container 3, 4 facing the mounting side 19, see the dashed lines in FIG. 6.

There may also be routed several connection lines 20 from a single operating component 13, 14 in the direction of the vehicle frame 2, as may be the case, for example, with a heat exchanger, which could have a cryogenic fluid line routed to the engine in the direction of the engine, a supply line for a heat exchange medium and a discharge line for a heat exchange medium, i.e. three connection lines 20 routed in the direction of the vehicle frame 2, see FIGS. 2 and 3.

However, it is not always necessary for an operating component 13, 14 to be in fluid connection with an engine of the vehicle 1 by means of a connection line 20, for example if the operating component 13, 14 is a filling coupling, which is routed directly through the lateral surface 16 into the cryogenic container 3, 4. It is also evident therefrom that the operating components 13, 14 do not necessarily have to be connected by means of a connection line 15. In particular, all operating components 13, 14 associated with one subsystem, e.g. the filling system, may be arranged in one of the spandrels Z1-Z4 and all operating components 13, 14 associated with another subsystem, e.g. the withdrawal system, may be arranged in another one of the spandrels Z1-Z4, such that no connection line 15 is required. Alternatively or additionally, operating components 13, 14 of the subsystems may also be provided together in one of the spandrels Z1-Z4, e.g. in one of the spandrels there may be present operating components 13, 14 of the withdrawal system as well as of the filling system, wherein there may be arranged, if necessary, further operating components of the withdrawal system in another one of the spandrels, for which purpose the operating components 13, 14 of the withdrawal system may in turn be connected by means of a connection line 15. If a control unit is used to control other operating components 13, 14, it may be connected to operating components 13, 14 of the withdrawal system, filling system, conditioning system and/or venting system.

Furthermore, it can be seen from the figures that the two operating components 13, 14 distributed around the circumference of the lateral surface 16 may be covered by a common cover 21. The cover 21 may be configured to be removable and, if necessary, may also optionally cover the connection line 15 or operating components 13, 14 in further spandrels.

Figure 10:
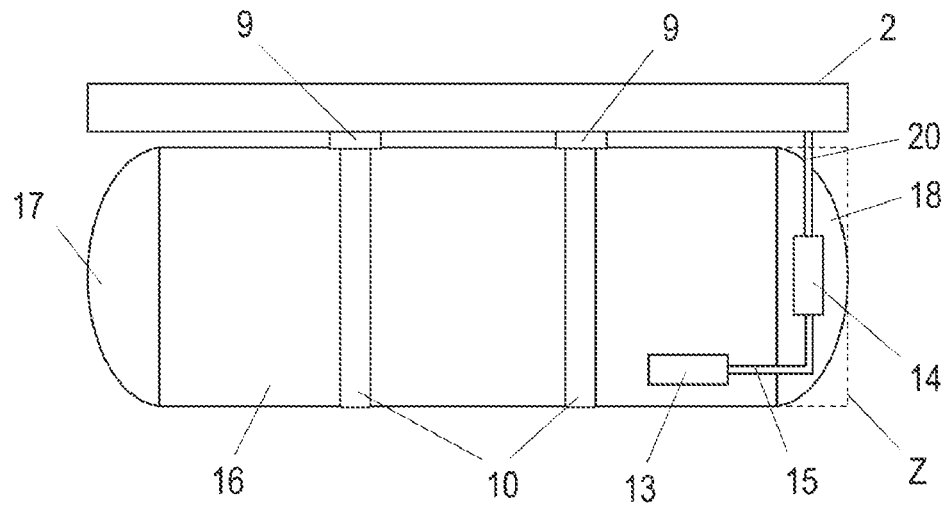
FIG. 10 shows a third embodiment according to the invention in a side view.
Figure 11:
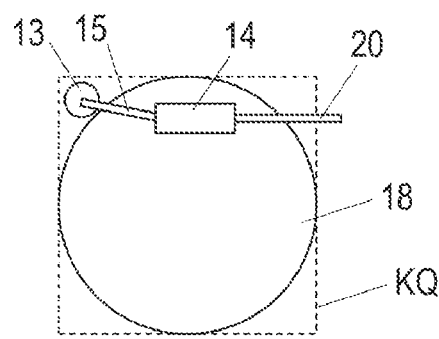
FIG. 11 shows the arrangement of FIG. 10 in a rear view and FIG. 12 illustrates a third embodiment according to the invention in a perspective view.

FIGS. 10 and 11 show a further arrangement according to the invention, wherein the first operating component 13 is arranged on the lateral surface 16 as described above and the second operating component 14 is arranged on the end cap 18. The second operating component 14 is at least in part, preferably completely, located in a cap spandrel Z5 enclosed between the end cap 18 and a smallest possible imaginary cylinder Z above this end cap 18. The axis of rotation of the imaginary cylinder Z generally coincides with an axis of rotation of the cryogenic container 3 or the end cap 18, respectively. In general, the second operating component 18 may also extend beyond this imaginary cylinder Z (FIG. 10), but usually does not extend beyond the installation space available. For example, the second operating component 14 is located entirely in a spandrel enclosed between the end cap 18 and a smallest possible imaginary cuboid KQ (FIG. 11) above this end cap 18.

The second operating component 14 is arranged horizontally, for example as shown in FIG. 11, but could also be arranged vertically or inclined at an angle. Depending on the shape of the operating component 14, it may also have no longitudinal extension and/or be adapted to the curvature of the end cap 18.

As in the embodiments described above, a connection line 15 may also be provided between the first operating component 13 and the second operating component 14 in the embodiment of the FIGS. 10 and 11, although this may also be omitted if, for example, connection lines 20 are routed separately from each operating component 13, 14 in the direction of the vehicle frame 2. The connection line 20 or connection lines 20 may in particular be routed through the spandrels enclosed between the end cap 18 and a smallest possible imaginary cylinder or cuboid. The imaginary cuboids of this embodiment are also arranged with horizontal or vertical sides.

In all the above embodiments, it is preferred that both the operating components 13, 14 and the connection line 20 and the connection line 15, if present, are located entirely within a smallest possible imaginary cuboid above the cryogenic container 3, 4.

For the sake of completeness, it is to be noted that in all of the above embodiments, there may be provided that a fluid line be routed through the lateral surface 16 or one of the end caps 17, 18. For example, a fluid line may be routed through one of the end caps 17, 18, wherein this fluid line may be routed to an operating component 13, 14, which is provided at the lateral surface 16 or that end cap 17, 18. Starting from this operating component 13, 14, a connection line 20 or a connection line 15 may be continued as described above, if necessary.

The invention claimed is:

1. A system comprising:
   a cryogenic container with a lateral surface and a first end cap and a second end cap;
   at least two support brackets each with a mounting side for mounting on a vehicle frame;
   at least two tensioning straps for fastening the cryogenic container on the at least two support brackets, wherein the cryogenic container rests with the lateral surface on the at least two support brackets and is embraced by the at least two tensioning straps over the lateral surface; and at least a first operating component and a second operating component of a withdrawal system, filling system, conditioning system and/or venting system of the cryogenic container, wherein the first operating component and the second operating component are located only on a side of an outermost tensioning strap of the at least two tensioning straps facing a nearest end cap of the first end cap and the second end cap without crossing over or under the at least two tensioning straps, wherein the first operating component is at least in part mounted on the lateral surface on an upper side of the cryogenic container facing away from the mounting side in an operating position, wherein the second operating component is at least in part mounted at one of the following positions:
on the lateral surface on an upper side of the cryogenic container facing the mounting side in the operating position,
on the lateral surface on a lower side of the cryogenic container facing away from the mounting side in the operating position,
on the lateral surface on a lower side of the cryogenic container facing the mounting side in the operating position.

2. The system according to claim 1, wherein the first and/or the second operating component are located at least in part in spandrels, which are enclosed between the lateral surface and a smallest possible imaginary cuboid, which circumscribes the lateral surface, wherein the smallest possible imaginary cuboid comprises side surfaces that arranged horizontally and vertically in the operating position.

3. The system according to claim 1, wherein the first and the second operating components are connected by means of a connection line.

4. The system according to claim 1, wherein the first and the second operating components are enclosed by a common cover.

5. The system according to claim 1, wherein at least one of the first operating component and the second operating component is arranged on the side of the cryogenic container facing away from the mounting side, the system further comprising a connection line that is connected to said at least one of the first operating component and the second operating component.

6. The system according to claim 5, wherein the respective nearest end cap has a convex curvature and the connection line is routed through a spandrel enclosed between the end cap and a smallest possible imaginary cuboid above this end cap.

7. The system according to claim 1, wherein the first operating component and the second operating component are selected from the following list: a heat exchanger, an economizer, a pressure relief valve, a check valve, a manual valve, an electromechanical valve, an electrical switch, a valve module comprising at least two valves, a filling fitting, a venting connection, a draining connection, a pump, a pressure build-up device, a pressure gauge and a control unit.

8. The system according to claim 1, wherein the first operating component is a heat exchanger, which is arranged at least in part on the lateral surface, and the second operating component is a filling fitting.

9. A vehicle with a vehicle frame and a system according to claim 1, wherein the at least two support brackets are mounted on the vehicle frame and the cryogenic container is fastened on the at least two support brackets by means of the at least two tensioning straps.

10. A system comprising:
a cryogenic container with a lateral surface and a first end cap and a second end cap;
at least two support brackets each with a mounting side for mounting on a vehicle frame;
at least two tensioning straps for fastening the cryogenic container on the at least two support brackets, wherein the cryogenic container rests with the lateral surface on the at least two support brackets and is embraced by the at least two tensioning straps over the lateral surface;
at least a first operating component and a second operating component of a withdrawal system, filling system, conditioning system and/or venting system of the cryogenic container,
wherein the first operating component and the second operating component are located only on a side of an outermost tensioning strap of the at least two tensioning straps facing a nearest end cap of the first end cap and the second end cap without crossing over or under the at least two tensioning straps,
wherein the first operating component is at least in part mounted on the lateral surface on an upper side of the cryogenic container facing the mounting side in an operating position, and
wherein the second operating component is at least in part mounted at one of the following positions:
on the lateral surface on an upper side of the cryogenic container facing away from the mounting side in the operating position,
on the lateral surface on a lower side of the cryogenic container facing away from the mounting side in the operating position,
on the lateral surface on a lower side of the cryogenic container facing the mounting side in the operating position.

11. A system comprising:
a cryogenic container with a lateral surface and a first end cap and a second end cap;
at least two support brackets each with a mounting side for mounting on a vehicle frame;
at least two tensioning straps for fastening the cryogenic container on the at least two support brackets, wherein the cryogenic container rests with the lateral surface on the at least two support brackets and is embraced by the at least two tensioning straps over the lateral surface;
at least a first and a second operating component of a withdrawal system, filling system, conditioning system and/or venting system of the cryogenic container,
wherein the first operating component and the second operating component are located only on a side of an outermost tensioning strap of the at least two tensioning straps facing a nearest end cap of the first end cap and the second end cap without crossing over or under the at least two tensioning straps,
wherein the first operating component is at least in part mounted on the lateral surface on a lower side of the cryogenic container facing away from the mounting side in an operating position, and
wherein the second operating component is at least in part mounted at one of the following positions:

on the lateral surface on an upper side of the cryogenic container facing the mounting side in the operating position,
on the lateral surface on an upper side of the cryogenic container facing away from the mounting side in the operating position,
on the lateral surface on a lower side of the cryogenic container facing the mounting side in the operating position.

12. A system comprising:
a cryogenic container with a lateral surface and a first end cap and a second end cap;
at least two support brackets each with a mounting side for mounting on a vehicle frame,
at least two tensioning straps for fastening the cryogenic container on the at least two support brackets, wherein the cryogenic container rests with the lateral surface on the at least two support brackets and is embraced by the at least two tensioning straps over the lateral surface,
at least a first operating component and a second operating component of a withdrawal system, filling system, conditioning system and/or venting system of the cryogenic container, wherein the first operating component and the second operating component are selected from the following list: a heat exchanger, an economizer, a pressure relief valve, a check valve, a manual valve, an electromechanical valve, an electrical switch, a valve module comprising at least two valves, a filling fitting, a venting connection, a draining connection, a pump, a pressure build-up device, a pressure gauge and a control unit,
wherein the first operating component and the second operating components are located only on a side of an outermost tensioning strap of the at least two tensioning straps facing the first end cap without crossing over or under the at least two tensioning straps,
wherein the first end cap has a convex curvature,
wherein the first operating component is at least in part mounted in a cap spandrel, which is enclosed between one of the first end cap and the second end cap and a smallest possible imaginary cylinder above the one of the first end cap and the second end cap, and
wherein the second operating component is at least in part mounted at one of the following positions:
on the lateral surface on an upper side of the cryogenic container facing away from the mounting side in an operating position,
on the lateral surface on an upper side of the cryogenic container facing the mounting side in the operating position,
on the lateral surface on a lower side of the cryogenic container facing away from the mounting side in the operating position,
on the lateral surface on a lower side of the cryogenic container facing the mounting side in the operating position,
wherein the second operating component is located at least in part in a second spandrel, which is enclosed between the lateral surface and a smallest possible imaginary cuboid, which circumscribes the lateral surface, wherein the smallest possible imaginary cuboid comprises side surfaces that are arranged horizontally and vertically in the operating position,
wherein the cap spandrel and the second spandrel do not overlap.

* * * * *